United States Patent
Khrushchev (10) Patent No.: US 10,197,228 B2
(45) Date of Patent: Feb. 5, 2019

(54) ILLUMINATING DEVICE COMPRISING A PUMP RADIATION SOURCE

(71) Applicant: OSRAM GmbH, Munich (DE)

(72) Inventor: Sergey Khrushchev, Regensburg (DE)

(73) Assignee: OSRAM GmbH, Munich (DE)

(*) Notice: Subject to any disclaimer, the term of this patent is extended or adjusted under 35 U.S.C. 154(b) by 0 days.

(21) Appl. No.: 15/328,905

(22) PCT Filed: Jul. 20, 2015

(86) PCT No.: PCT/EP2015/066537
§ 371 (c)(1),
(2) Date: Jan. 25, 2017

(87) PCT Pub. No.: WO2016/016032
PCT Pub. Date: Feb. 4, 2016

(65) Prior Publication Data
US 2017/0211757 A1    Jul. 27, 2017

(30) Foreign Application Priority Data
Aug. 1, 2014  (DE) .................. 10 2014 215 220

(51) Int. Cl.
*F21K 9/64* (2016.01)
*F21V 9/30* (2018.01)
(Continued)

(52) U.S. Cl.
CPC ................ *F21K 9/64* (2016.08); *F21S 41/14* (2018.01); *F21S 41/141* (2018.01); *F21S 41/16* (2018.01);
(Continued)

(58) Field of Classification Search
CPC ........ F21K 9/64; F21K 9/00; F21K 2099/005; F21S 48/1145; F21S 48/1225;
(Continued)

(56) References Cited

U.S. PATENT DOCUMENTS

| 2,117,737 A | 5/1938 | May |
| 5,535,230 A | 7/1996 | Abe |

(Continued)

FOREIGN PATENT DOCUMENTS

WO    2013134802 A1    9/2013

OTHER PUBLICATIONS

International Search Report based on application No. PCT/EP2015/066537 (6 pages + 2 pages English translation) dated Jan. 18, 2016.
(Continued)

*Primary Examiner* — Y M. Lee
(74) *Attorney, Agent, or Firm* — Viering Jentschura & Partner MBB (57) ABSTRACT

An illuminating device includes a pump radiation source for emitting pump radiation as a beam bundle, a phosphor element for converting the pump radiation into conversion light, and a lens system between the pump radiation source and the phosphor element, which is penetrated by the pump beam bundle, wherein the lens system has a focus and the phosphor element is arranged at the focus, and wherein furthermore a lens of the lens system has a scattering means which scattering means the pump beam bundle penetrates and is widened at the same time, so that the pump beam bundle is incident on the phosphor element in a manner widened around a focus point.

15 Claims, 2 Drawing Sheets

(51) Int. Cl.
   *F21S 41/20* (2018.01)
   *F21S 41/14* (2018.01)
   *F21S 41/141* (2018.01)
   *G03B 21/20* (2006.01)
   *F21S 41/16* (2018.01)
   *F21Y 101/00* (2016.01)
   *F21Y 115/30* (2016.01)

(52) U.S. Cl.
   CPC ............ *F21S 41/285* (2018.01); *F21V 9/30* (2018.02); *G03B 21/204* (2013.01); *G03B 21/2013* (2013.01); *F21Y 2101/00* (2013.01); *F21Y 2115/30* (2016.08)

(58) Field of Classification Search
   CPC .......... F21S 41/14; F21S 41/16; F21S 41/141; F21S 41/285; F21V 9/16; F21V 5/04; F21V 5/048; F21V 13/04; F21V 13/14; F21V 9/30; F21Y 2115/30; G03B 21/2033; G03B 21/204; G03B 21/2013
   See application file for complete search history.

(56) References Cited

U.S. PATENT DOCUMENTS

| | | |
|---|---|---|
| 2005/0105301 A1* | 5/2005 | Takeda ................. F21S 48/1145 362/545 |
| 2011/0157865 A1 | 6/2011 | Takahashi et al. |
| 2012/0163009 A1 | 6/2012 | Nakazato |
| 2014/0132937 A1 | 5/2014 | Daniels |
| 2015/0049501 A1 | 2/2015 | Bauer et al. |

OTHER PUBLICATIONS

German Search Report based on application No. 10 2014 215 220.8 (7 pages) dated Feb. 24, 2015.

* cited by examiner

ILLUMINATING DEVICE COMPRISING A PUMP RADIATION SOURCE

RELATED APPLICATIONS

The present application is a national stage entry according to 35 U.S.C. § 371 of PCT application No.: PCT/EP2015/066537 filed on Jul. 20, 2015, which claims priority from German application No.: 10 2014 215 220.8 filed on Aug. 1, 2014, and is incorporated herein by reference in its entirety.

TECHNICAL FIELD

Various embodiments relate to an illuminating device including a pump radiation source for emitting pump radiation and a phosphor element for converting the pump radiation into longer-wave conversion light.

BACKGROUND

For example, a laser can be used as the pump radiation source, and the pump radiation can be, for example, UV radiation or advantageously blue light. The conversion light then has at least components in the visible spectral range and can be used for illumination, for example.

The present disclosure is based on the technical problem of specifying a particularly advantageous illuminating device including pump radiation source and phosphor element.

SUMMARY

According to the present disclosure, this problem is solved by an illuminating device including a pump radiation source for emitting pump radiation as a beam bundle, a phosphor element for converting the pump radiation into conversion light, and a lens system between the pump radiation source and the phosphor element, which is penetrated by the pump beam bundle, wherein the lens system has a focus and the phosphor element is arranged at the focus, and wherein furthermore at least one lens of the lens system has a scattering means, which the pump beam bundle penetrates and is widened at the same time, so that the pump beam bundle is incident on the phosphor element in a manner widened around a focus point.

Preferred embodiments are found in the description and the dependent claims, wherein the depiction does not always differentiate in detail between device and use aspects; in any case, the disclosure is to be implicitly read with respect to all claim categories.

The conversion light may advantageously be longer-wave than the pump radiation (down conversion). In general, an up conversion is alternatively also possible, in which, for example, longer-wave laser radiation is converted into shorter-wave conversion light.

The inventor has observed that a punctiform concentration of the pump radiation on the phosphor element can result in local overheating and, as a result, rapid degradation of the phosphor. The approach according to the present disclosure is directed toward arranging the phosphor element in the focus of the lens system in the scope of what is technically possible, but at the same time avoiding the formation of a hotspot by way of the scattering-related widening.

An approach which was alternatively considered initially by the inventor would, however, have consisted of arranging the phosphor element outside the focus, i.e., significantly in front of or behind the focal plane. However, the inventor has determined that a small offset in this case, which can also still be within typical manufacturing variations, for example, can finally have the result that the phosphor element is then still in the focus or close thereto. In mass production, it can therefore potentially contribute to faults to set a widening of a collimated pump beam bundle by way of an offset of the phosphor element in relation to the focal plane. This is all the more true if multiple pump radiation sources are advantageously provided, i.e., multiple pump beam bundles have to be guided together.

According to various embodiments, the pump beam bundle is therefore guided by a lens system to the phosphor element, wherein the latter is arranged at the focus of the lens system. The arrangement "at" the focus means that a pump radiation incidence surface of the phosphor element is at a distance of, for example, not greater than 200 µm, 150 µm, 100 µm, 50 µm, or 20 µm (increasingly advantageously in the sequence in which they are named) from the focus/focus point (taken along the center axis of the pump beam bundle). An arrangement precisely in the focus is preferred in the scope of what is technically possible.

This can advantageously simplify the installation, cf. the following description in detail. To also avoid a hotspot formation, one lens of the lens system has a scattering means, so that the pump beam bundle is incident on the phosphor element in a manner widened in the focus around the focus point. Because the scattering means enlarges the etendue (product of beam bundle cross section and projected solid angle), i.e., in simplified form, the spatial volume filled by the light, hotspot formation advantageously cannot occur even in the case of an unintentional offset between phosphor element and lens system. If the beam bundle is widened in the focus around the focus point, it is accordingly also widened offset at a distance thereto (at the focus).

On a pump radiation incidence surface of the phosphor element, the pump beam bundle is to have, for example, a spot diameter of at least 10 µm, in this sequence increasingly advantageously at least 50 µm, 100 µm, 150 µm, 200 µm, 250 µm, or 300 µm; possible upper limits can be, for example, at most 1 mm, in this sequence increasingly advantageously at most 0.9 mm, 0.8 mm, 0.7 mm, 0.6 mm, or 0.5 mm (an upper limit can be of interest independently of a lower limit, and vice versa). In the case of a noncircular spot, the diameter relates to the mean value of smallest and largest spot extension.

The "focus point" is a point in which the beams penetrating the lens system would theoretically meet if the lens did not have scattering means. The beam bundle cross section would be reduced to a point (the focus point) there. The focus point is thus ascertained at the lens system free of scattering means according to the principles of geometrical optics.

With respect to the path of the pump radiation, the "focus" is then arranged at the same position, but all beams of the pump beam bundle do not meet in a single point, but rather they penetrate a small area; in this regard, the values disclosed above for the spot diameter are also to be disclosed for this area in the focus. This means in general "widening around the focus point". In the focus, the diameter of the pump beam bundle is minimal, in any case in comparison to a region immediately upstream and a region immediately downstream (in which the pump beam bundle does not propagate further, however, but rather the phosphor element is arranged).

The "lens system" can also consist in general of a single lens, which then has the scattering means; however, it may be multiple lenses in this case. The focus/focus point is determined for the lens system as a whole, i.e., in consideration of all lenses between the pump radiation source and the phosphor element. The arrangement of the lens system "between" pump radiation source and phosphor element relates to the path of the pump beam bundle, i.e., for example, in the case of a pump beam bundle guided around a corner, not necessarily to the geometrically shortest connection.

The scattering means widens the opening angle of the pump beam bundle in a preferred embodiment by at least 0.5°, in this sequence increasingly advantageously at least 1°, 1.5°, 2°, 2.5°, 30°, 3.5°, 4°, or 4.5°; preferred upper limits can be, for example, increasingly advantageously in this sequence, at most 10°, 9.5°, 9°, 8.5°, 8°, 7.5°, 7°, 6.5°, 6°, or 5.5° (an upper limit can also be of interest independently of a lower limit, and vice versa). If the pump beam bundle is to be widened differently in the axes perpendicular to its focal point direction, a mean value is considered. However, the widening is advantageously to be uniform, it is thus not to deviate from one another by more than 30%, advantageously not more than 15% (with respect to the greater widening) in two axes perpendicular to one another, which advantageously applies for all axis pairs perpendicular to one another and to the focal point direction.

The "opening angle" is taken between the lateral surfaces of the pump beam bundle, specifically in each case in a sectional plane which contains the center axis of the pump beam bundle. The "center axis" is parallel to the focal point direction of the beam bundle in the respective observed portion and extends centrally in the pump beam bundle, i.e., it is in the area focal point (of the cross-sectional area of the pump beam bundle) as observed in a sectional plane perpendicular to the focal point direction. The lateral surface of the pump beam bundle is to be located with respect to a distance in relation to the center axis, i.e., considered in a sectional plane perpendicular thereto, at the point where the pump radiation power has dropped to half of the maximum (half width).

In the scope of this disclosure, "focal point direction" relates to the mean value of all directional vectors of the beam bundle in a respective portion between two optical elements, in particular lenses (which can change the focal point direction). In this mean value calculation, each directional vector is weighted with the luminous intensity associated with it.

In general, the scattering means could also be embedded, for example, as a so-called volume diffuser in the volume of the lens material, however, it is advantageously provided at the light entry surface of the lens. In general, the scattering could also be performed, for example, by means of a holographic structure or a diffraction grating, for example, applied in the form of a coating. Furthermore, a geometrically defined surface texture is also conceivable, so that the scattering would thus take place according to the principles of geometrical optics. A matting of the light entry surface is preferable, which can also be applied as a coating, for example, but is advantageously achieved by roughening the surface.

In one preferred embodiment, the light entry surface of the lens is spherical, a planar-spherical lens is furthermore preferable, a hemispherical lens is particularly preferable. As explained hereafter in detail, in the case of a hemispherical lens, the planar side of which extends through the sphere center point, arranging the phosphor element at or in the focus, if it is located in the sphere center point (the focus of the lens system, not the hemispherical lens alone) can also be well controllable with regard to mass production. This is because the phosphor element can be arranged well reproducibly on the planar side; hotspot formation is still avoided due to the widening using the scattering means.

Downstream from the lens, the pump beam bundle is incident on the phosphor element, specifically on its pump radiation incidence surface. This means the entire lateral surface of the phosphor element, through which the pump radiation enters, i.e., not only the region (spot) thereof through which the pump radiation radiates. For example, if the phosphor element is cuboid, the pump radiation incidence surface can be a rectangular lateral surface of the cuboid; in the case of a cylindrical phosphor element, for example, the cylindrical footprint can be the pump radiation incidence surface.

The pump radiation incidence surface has a mean extension x, which results as the mean value of its smallest and largest extensions, for example, in the case of a rectangular surface, as the mean value of surface diagonal and shortest edge. The sphere on which the spherical light entry surface is based has a radius R, and then advantageously $R \geq x/2$ is valid, wherein further advantageous lower limits for R, increasingly advantageously in this sequence, are at least $3x/4$, x, $5x/4$, $3x/2$, $7x/4$, or $2x$. Advantageous upper limits can be, for example, at most $10x$, $8x$, $6x$, $4x$, or $3x$, increasingly advantageously in the order they are named (an upper limit can also be of interest independently of a lower limit and vice versa).

In absolute values, the pump radiation incidence surface can for example have a mean extension x of at least 0.7 mm, 1 mm, 1.3 mm, 1.6 mm, 1.9 mm, or 2.2 mm; possible upper limits are, for example, at most 8 mm, 7 mm, 6 mm, 5 mm, 4 mm, or 3 mm (in each case increasingly advantageously in the sequence they are mentioned), wherein upper and lower limits can also be of interest independently of one another. A rectangular shape is preferred, wherein the longer side edge is furthermore advantageously not to be greater than 50%, 30%, or 10% longer than the shorter; a square shape is particularly preferred.

A surface focal point of the pump radiation incidence surface has a distance d taken along a surface normal in relation to the spherical light entry surface, and then advantageously $d \geq 0.9 \cdot R$, more advantageously $d \geq 0.95 \cdot R$, particularly advantageously $d \geq R$ is valid. Particularly advantageously, as also already mentioned, $d=R$ (in the scope of routine technical deviations), the phosphor element is thus then arranged at the planar light exit surface of a hemispherical lens.

The arrangement of the phosphor element "at" the light exit surface means in direct optical contact therewith, i.e., either directly applied or connected thereto via a joining connection layer, advantageously an adhesive layer. Such an adhesive layer can cause a slight offset of the phosphor element in relation to the sphere center point, however, it is small in comparison to the other dimensions (x, R, etc.) and is thus negligible.

In one preferred embodiment, the pump beam bundle is incident on the spherical light entry surface convergently in relation to the sphere center point. Each beam of the pump beam bundle is thus then perpendicular to the light entry surface. The pump beam bundle accordingly penetrates the light entry surface without refraction, i.e., without change of the focal point direction. In other words, the focus point is in the sphere center point and the pump beam bundle would be focused there in one point without the scattering means according to various embodiments.

In principle, instead of a planar-spherical lens having concentric coupling, for example, a planar-aplanatic lens can also be used. It has, like the planar-spherical lens, no spherical aberration, but does have refractive power, which enables refraction of the pump beam bundle.

One advantage of the hemispherical lens is, on the one hand, the predefined position for the phosphor element if the sphere center point is equivalent to the focus point. On the other hand, in principle an arbitrary number of pump beam bundles may also be coupled in accordingly via the same spherical light entry surface and guided together in the sphere center point, to be incident there on the phosphor element. In this case, the pump beam bundles can be arranged in a cascading manner, comparable to different degrees of latitude on the Earth's surface. The arrangement can thus be cascaded arbitrarily, cf. FIG. 1 for illustration, wherein an arrangement having fourfold rotational symmetry on a shared degree of latitude is shown here.

A preferred embodiment also relates in this regard to an illuminating device including multiple pump radiation sources. Each pump radiation source emits a respective pump beam bundle, which advantageously each penetrate a lens including a scattering means, advantageously a shared lens having scattering means. The respective pump beam bundles are particularly advantageously guided together in the shared lens having scattering means, they thus each have a separate optical unit upstream thereof; in other words, the respective lens systems share the lens having scattering means, but otherwise differ.

In the case of multiple pump radiation sources and accordingly multiple pump beam bundles (precisely one pump beam bundle per pump radiation source is preferred), advantageously, each pump beam bundle is widened around the respective focus point in a manner described above using a scattering means. The focus points of the respective lens systems are advantageously coincident in the scope of what is technically possible. A hemispherical lens is thus particularly preferred and the focus points are then located in the sphere center point.

A further preferred embodiment can be of interest with respect to the safety of the illuminating device, specifically if the phosphor element falls off of the hemispherical lens, for example, as a result of mechanical strain (shock, impact, differing thermal expansion, etc.). To prevent the high-energy pump radiation from exiting in this case where the conversion light is actually emitted (user side), the coupling into the spherical light entry surface advantageously takes place so that the pump radiation is totally reflected at the light exit surface if no phosphor element is arranged there (it has thus fallen off).

The lens has a critical angle $\Theta_c$, which results from the index of refraction n of the lens material, advantageously in relation to air as the ambient medium as $\Theta_c \approx \arcsin(1/n)$; in the case of sapphire having an index of refraction of approximately 1.78 (at 400 nm), $\Theta_c$ can thus be approximately 34°, for example. If the phosphor element is adhesively bonded on, the index of refraction of the adhesive $n_{adhesive}$ can also be taken into consideration, $\iota_c \arcsin(n_{adhesive}/n)$.

The critical angle $\Theta_c$ relates to a surface normal, which is coincident with the optical axis of the lens in the case of the light exit surface. The pump beam bundle should accordingly penetrate the light entry surface with a focal point direction (without refraction), which is tilted by an angle $\Theta \geq \Theta_c$ in relation to the optical axis. Further advantageous lower limits for $\Theta$ are at $1.05 \cdot \Theta_c$, $1.1 \cdot \Theta_c$, $1.15 \cdot \Theta_c$, $1.2 \cdot \Theta_c$, $1.25 \cdot \Theta_c$, or $1.3 \cdot \Theta_c$ (increasingly advantageously in the order they are mentioned).

If, in one preferred embodiment, multiple pump radiation sources are provided, each pump beam bundle is advantageously coupled in accordingly. An arrangement is particularly preferred in this case such that a first and a second pump beam bundle are rotationally symmetrical with respect to the optical axis in relation to one another, specifically precisely in a twofold manner having an angle of rotation of 180°. By a rotation about the optical axis by 180°, the first pump beam bundle can thus be transferred into the second, and vice versa. In this case, the portion inside the hemispherical lens is observed in each case, the arrangement of the pump radiation sources thus does not generally also have to necessarily be rotationally symmetrical accordingly, although it is preferred. One advantage of the pump beam bundles arranged rotationally symmetrically in relation to one another is then, for example, that in the mentioned case of fault (phosphor element falls off), the one pump beam bundle can leave the lens on the path of the other, and vice versa. This is because the lens, as explained in greater detail hereafter, can also be mirrored on the light entry surface except for openings in the region of the pump beam bundles, which can offer advantages with respect to the efficiency. In this regard, the rotationally symmetrical arrangement thus then ensures that the pump radiation which is totally reflected in case of fault can also leave the lens again, specifically away from the phosphor element and therefore the "user side".

In general, a plurality of pump beam bundles can also be provided and can be rotationally symmetrical in relation to one another, also having a multiple rotational symmetry (more than twofold). For example, if four pump beam bundles are provided, there can be two first and two second pump beam bundles (in the meaning just described), of which each pair are precisely twofold rotationally symmetrical; overall, the four pump beam bundles can then be arranged so they have fourfold rotational symmetry. In general, an arbitrary multiple rotational symmetry is possible, in particular 2n-fold with n=1, 2, 3, 4, etc.

In general, the light entry surface of the lens is at least regionally provided with a reflection layer in a preferred embodiment. In general, this can also be a dichroic reflection layer in this case, for example, which is substantially transmissive for the pump radiation (for example, at least 80%, advantageously at least 90% transmission), but at least partially reflects the conversion light, i.e., for example, at least 30%, 40%, 50%, 60%, or 70% (increasingly advantageously in the sequence they are mentioned) of the conversion light emitted at the pump radiation incidence surface.

Although the conversion light emission surface of the phosphor element is opposite to the pump radiation incidence surface, the phosphor element is thus operated in transmission, conversion light is specifically also emitted at the pump radiation incidence surface (backscatter conversion light). The emission of the conversion light takes place omnidirectionally in principle in any case in the phosphor element.

Using a reflection layer at the light entry surface of the lens, conversion light emitted at the pump radiation incidence surface of the phosphor element can be reflected back. It then thus has at least one directional component along a focal point emission direction of the conversion light at the conversion light emission surface. As a result, the efficiency is increased, more conversion light is thus usable.

The conversion light can be collected, for example, at the conversion light emission surface using an optical unit, for example, an imaging optical unit, and then used for illumination. If, in a preferred embodiment, the light entry surface and therefore the reflection layer is spherical and if the sphere center point is in the pump radiation incidence surface in the scope of technically customary deviations, the backscatter conversion light is advantageously incident substantially perpendicularly on the reflection layer (in any case backscatter conversion light emitted in a region around the sphere center point).

The backscatter conversion light is accordingly also reflected essentially back to the phosphor element, it can then thus be used at the conversion light emission surface jointly with the conversion light originally emitted there (an optical unit arranged there does not have to take into consideration light guided past the phosphor element, which can simplify the expenditure).

In one preferred embodiment, the reflection layer is also reflective for the pump radiation, it is thus full mirroring. The degree of reflection for conversion light and pump radiation can be, for example, at least 80%, 85%, 90%, 95%, or 97% (increasingly advantageously in the sequence they are mentioned). A metal film can thus be applied to the light entry surface, for example, such as a silver film or an ITO coating.

A corresponding reflection layer is then interrupted where the pump beam bundle penetrates the light entry surface, i.e., for example, provided with a hole or opening which takes into consideration the diameter of the pump beam bundle. On the other hand, in case of coupling of the pump beam bundle tilted at an angle in relation to the optical axis (in particular at $\Theta \geq \Theta_c$), only a region of the light entry surface around the optical axis can also be mirrored, i.e., a cap at angles<$\Theta$.

With reference to the above-mentioned case of fault (phosphor element falls off), a regionally mirrored light entry surface can offer advantages in the case of coupling in at $\Theta > \Theta_c$, also in the case of a non-twofold rotationally symmetrical arrangement of the pump beam bundles. The pump radiation which is totally reflected at the light exit surface in the case of fault is then incident on the reflection layer at the light entry surface of the lens and is reflected thereby (in particular in the case of the preferred hemispherical lens) back to the light exit surface, i.e., where the phosphor element was. It is totally reflected again there and can exit via the scattering means along the original coupling-in path. The safety on the user side is ensured.

Various embodiments also relate to the use of an illuminating device disclosed in the present case as a light source for illumination. Projection devices or endoscopes are one area of application, for example. An application in the field of motor vehicle external illumination is particularly preferred, more advantageously as a light source of an automobile front headlight. In general, all of the pump radiation does not necessarily have to be converted (full conversion), but rather only a part thereof can also be converted and a mixture of pump radiation (pump light) and conversion light can be used (partial conversion). Full conversion is preferred. Blue pump light is preferred as the pump radiation.

The pump radiation source may advantageously be a laser, particularly advantageously a laser diode.

In the case of multiple pump radiation sources, multiple laser diodes of identical or different frequency (wavelength) and emission characteristic and having identical or different operating mode (DC, cycled, sequential operation, simultaneous operation) are thus then advantageously arranged in an array.

BRIEF DESCRIPTION OF THE DRAWINGS

Various embodiments will be explained in greater detail hereafter on the basis of exemplary embodiments, wherein the individual features in the scope of the coordinate claims can also be essential to various embodiments in other combinations and also furthermore differentiation is not always made in detail between the different claim categories.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
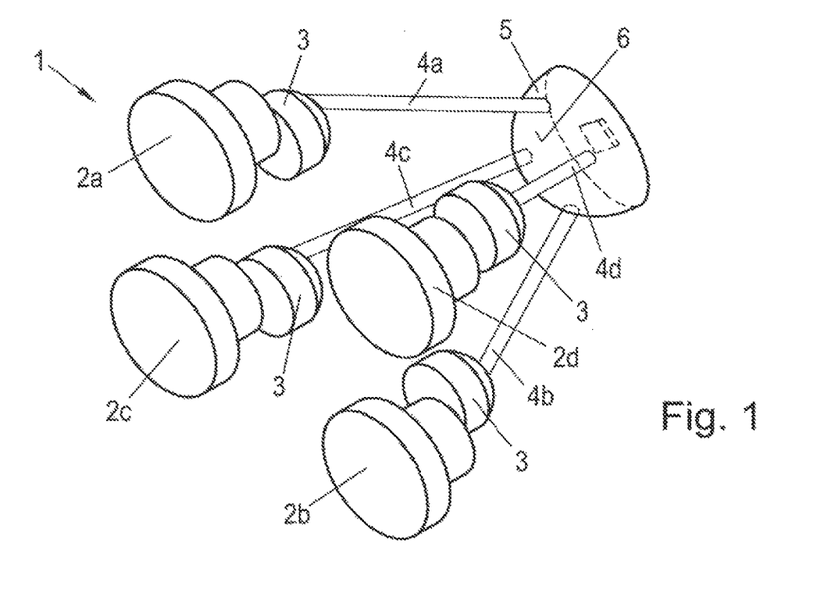
FIG. 1 shows an illuminating device according to various embodiments having four laser diodes in a schematic overview.

FIG. 1 shows an illuminating device 1 according to various embodiments in a schematic overview. Four laser diodes 2 can be seen as pump radiation sources. The laser diodes emit at approximately 450 nm and have a radiant power of 1.5 W to 3.0 W. A planar convex lens 3 is associated with each of the laser diodes 2, which bundles the pump radiation (blue pump light) emitted from the respective laser diode 2 and guides it onto a hemispherical lens 5.

The pump beam bundles 4 are incident on a light entry surface 6 of the hemispherical lens 5 made of sapphire and penetrate the latter up to an opposing light exit surface 21. The light exit surface is located facing away on the rear side in relation to the observation direction according to FIG. 1, because of which reference is also made to FIG. 2 for the illustration. The pump radiation is incident on a phosphor element 22 via the light exit surface 21. The phosphor element is arranged at the light exit surface 21 of the hemispherical lens 5, specifically bonded thereto via a thin adhesive layer (<50 μm).

Figure 2:
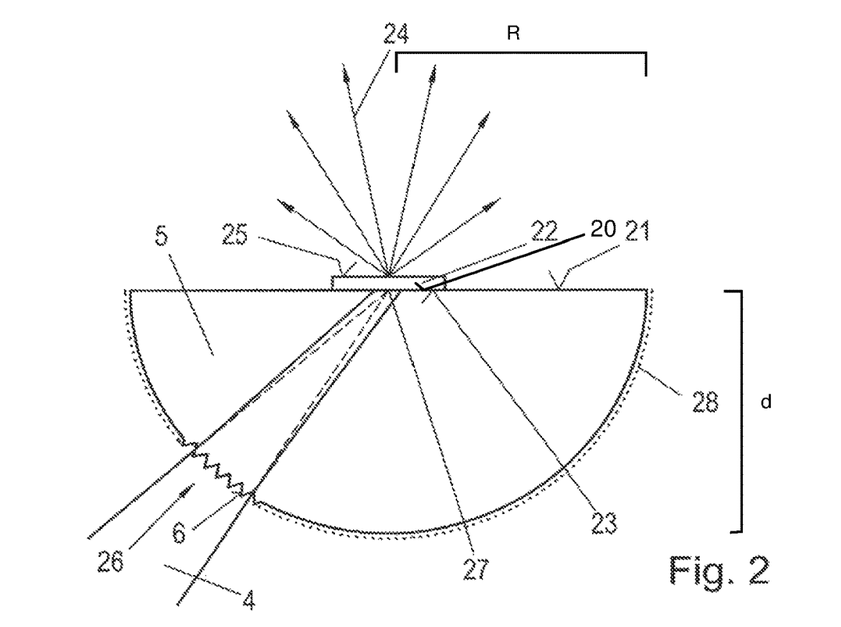
FIG. 2 shows a schematic section through a hemispherical lens having scattering means, reflection layer, and phosphor element.

The pump radiation is incident on a pump radiation incidence surface 23 of the phosphor element 22 and is converted at least in portions thereby (in the present case a yellow YAG:Ce phosphor) into longer-wave conversion light 24. The conversion light 24 and possibly non-converted pump light is emitted at a conversion light emission surface 25 of the phosphor element 22, which is located opposite to the pump radiation incidence surface 23. The respective planar convex lens 3 and the hemispherical lens 5 form a lens system for each laser diode 2, by which the pump radiation is guided onto the phosphor element 22.

FIG. 2 furthermore illustrates that the light entry surface 6 of the hemispherical lens 5 is somewhat roughened in the region in which the pump beam bundle 4 (only one of the four pump beam bundles is shown for the sake of comprehensibility) is incident thereon. This surface roughening 26 represents a scattering means, the pump beam bundle 4 is widened during the passage. The opening angle increases by approximately 5°.

The beam propagation in the undisturbed case is indicated in FIG. 2 by dashed lines; the pump beam bundle 4 would be incident on the phosphor element 22 in concentrated form in a focus point 27, which would result in local overheating (hotspot) of the phosphor element 22. To avoid this, the pump beam bundle 4 is widened by scattering, and is thus incident on the phosphor element 22 widened accordingly around the focus point 27. The phosphor element is arranged at the focus 20, but the pump beam bundle 4 is not concentrated in a point thereon.

The light entry surface 6 is furthermore provided with a reflection layer 28, specifically a silver film. Because it would also reflect the pump radiation, the reflection layer 28 is interrupted where the pump beam bundles 4 are coupled in.

Figure 3:
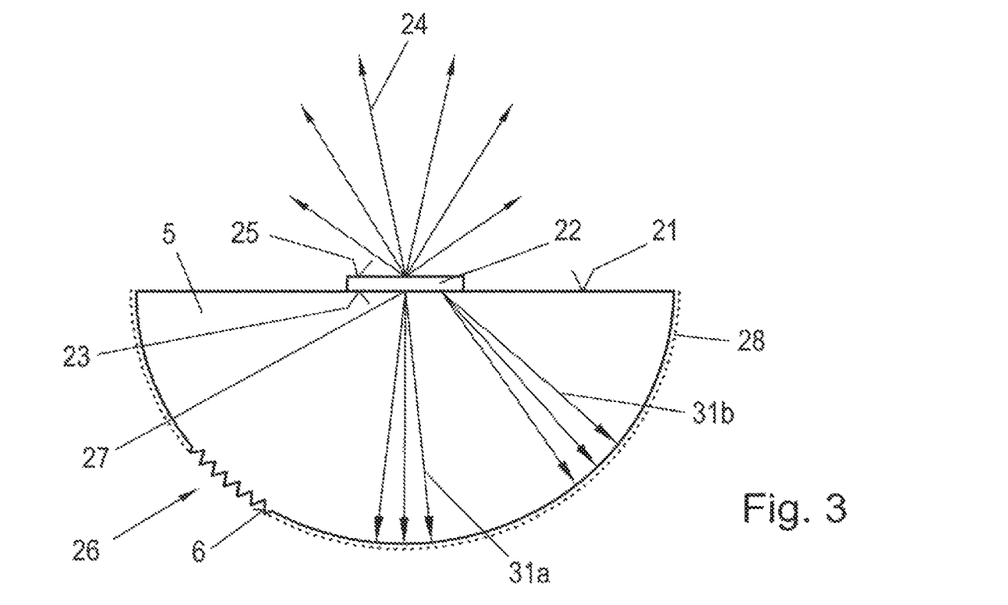
FIG. 3 shows backscatter conversion light emitted at the pump radiation incidence surface of the phosphor element according to FIG. 2.

FIG. 3 illustrates the function of the reflection layer 28, wherein in this illustration the pump beam bundle 4 incident via the scattering means 26 is not shown for the sake of comprehensibility. The conversion light which is generated in the phosphor element 22 upon the excitation using the pump radiation is also emitted at the pump radiation incidence surface 23, namely as backscatter conversion light 31. The backscatter conversion light 31a emitted in the middle of the pump radiation incidence surface 23, which is thus emitted at the focus point and therefore at the sphere center point, is incident perpendicularly on the reflection layer 28 and is accordingly reflected back to the same point of the pump radiation incidence surface 23.

Backscatter conversion light 31b emitted at the edge of the pump radiation incidence surface 23 is not incident exactly, but is incident at least approximately perpendicularly on the reflection layer 28 and is also largely reflected back to the pump radiation incidence surface 23. The backscatter conversion light thus guided back to the phosphor element 22 can then be used at the conversion light emission surface 25 jointly with the conversion light 24 originally emitted there.

Not only conversion light is backscattered, but rather also a part of the pump radiation. This backscattering takes place comparably with the backscatter conversion light 31 with respect to the directions. The backscatter pump radiation is also reflected at the reflection layer 28 and thus guided back to the pump radiation incidence surface 23, which further increases the efficiency.

The schematic illustration according to FIG. 4 once again shows the same structure, wherein in this case two pump beam bundles 4a, b are shown, i.e., a schematic section through the arrangement according to FIG. 1. Each of the pump beam bundles 4a, b is coupled in via a respective scattering means 26 and is widened accordingly around the focus point 27.

Figure 4:
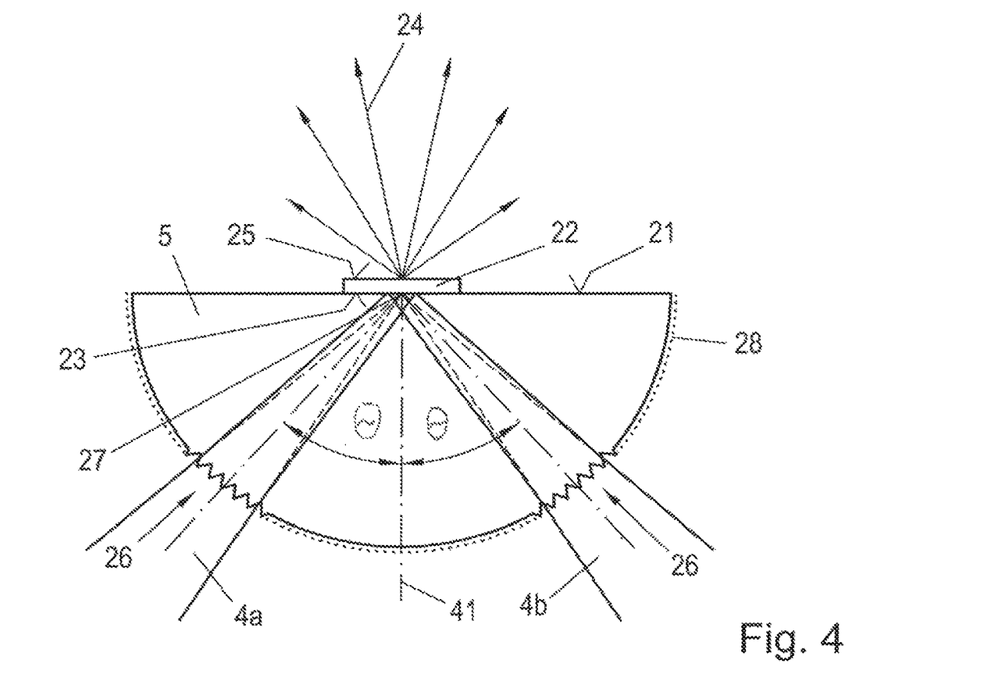
FIG. 4 shows the coupling in of multiple pump beam bundles.

The two pump beam bundles 4a, b are furthermore rotationally symmetrical in relation to the optical axis 41 of the hemispherical lens 5, specifically precisely in a twofold manner. Furthermore, the two beam bundles 4a, b are tilted in relation to the optical axis 41 such that the pump radiation is incident at an angle of incidence $\Theta > \Theta_c$ on the light exit surface 21 of the hemispherical lens 5.

In case of fault, if the phosphor element 22 falls off of the hemispherical lens 5, the two pump beam bundles 4a, b are therefore totally reflected at the light exit surface 21 and the first pump beam bundle 4a can then leave the hemispherical lens 5 on the path of the second pump beam bundle 4b (in the opposite direction), and vice versa.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. An illuminating device comprising:
    a pump radiation source for emitting pump radiation as a beam bundle,
    a phosphor element for converting the pump radiation into conversion light, and
    a lens system between the pump radiation source and the phosphor element,
    which is penetrated by the pump beam bundle,
    wherein the lens system has a focus and the phosphor element is arranged at the focus,
    wherein a lens of the lens system has a scattering means which scattering means the pump beam bundle penetrates and is widened at the same time, so that the pump beam bundle is incident on the phosphor element in a manner widened around a focus point;
    wherein the lens comprising the scattering means has a spherical light entry surface; and
    wherein the pump beam bundle is incident on a pump radiation incidence surface of the phosphor element, which has a mean extension x, and a sphere on which the spherical light entry surface is based has a radius R, wherein $R \geq x/2$.

2. The illuminating device as claimed in claim 1, wherein the scattering means widens the opening angle of the pump beam bundle by at least 0.5° and at most 10°.

3. The illuminating device as claimed in claim 1, wherein the scattering means is provided at a light entry surface of the lens.

4. The illuminating device as claimed in claim 1, wherein the pump beam bundle is incident on a pump radiation incidence surface of the phosphor element and a surface focal point of the pump radiation incidence surface has a distance d taken along a surface normal in relation to the spherical light entry surface and a sphere on which the spherical light entry surface is based has a radius R, wherein $d \geq 0.9 \cdot R$, preferably $d = R$.

5. The illuminating device as claimed in claim 1, wherein the lens is a planar-spherical lens, and wherein the phosphor element is arranged at alight exit surface of the lens.

6. The illuminating device as claimed in claim 1, wherein a sphere on which the spherical light entry surface is based has a center point and the pump beam bundle is incident on the spherical light entry surface convergently in relation to the center point.

7. The illuminating device as claimed in claim 5, wherein the lens has an optical axis, which is perpendicular to the light exit surface, wherein $\Theta_c$ is the critical angle for total reflection at the light exit surface, and wherein the pump beam bundle penetrates the spherical light entry surface with a focal point direction which is tilted by an angle $\Theta \geq \Theta_c$ in relation to the optical axis.

8. The illuminating device as claimed in claim 1, further comprising a plurality of pump radiation sources.

9. The illuminating device as claimed in claim 7, wherein a first pump beam bundle, which originates from a first pump radiation source, and a second pump beam bundle, which originates from a second pump radiation source, are rotationally symmetrical in relation to one another in the planar-spherical lens with respect to the optical axis, specifically precisely in a twofold manner having an angle of rotation of 180°.

10. The illuminating device as claimed in claim 1, wherein the light entry surface of the lens is at least regionally provided with a reflection layer.

11. The illuminating device as claimed in claim 10, wherein the reflection layer is reflective both for the conversion light and for the pump radiation, wherein a region of the light entry surface, which the pump beam bundle penetrates, is free of the reflection layer.

12. The illuminating device as claimed in claim 3, wherein the scattering means is provided at the light entry surface of the lens as a coating or surface roughening.

13. The illuminating device as claimed in claim 5, wherein the light exit surface of the lens, which is opposite to the spherical light entry surface, is planar.

14. A use of an illuminating device comprising:
   emitting pump radiation as a beam bundle with a pump radiation source,
   converting the pump radiation into conversion light with a phosphor element, and penetrating a lens system between the pump radiation source and the phosphor element with the pump beam bundle,
   wherein the lens system has a focus and the phosphor element is arranged at the focus,
   wherein a lens of the lens system has a scattering means which scattering means the pump beam bundle penetrates and is widened at the same time, so that the pump beam bundle is incident on the phosphor element in a manner widened around a focus point;
   wherein the lens comprising the scattering means has a spherical light entry surface;
   wherein the pump beam bundle is incident on a pump radiation incidence surface of the phosphor element, which has a mean extension x, and a sphere on which the spherical light entry surface is based has a radius R, wherein $R \geq x/2$.

15. An illuminating device comprising:
   a pump radiation source for emitting pump radiation as a beam bundle,
   a phosphor element for converting the pump radiation into conversion light, and
   a lens system between the pump radiation source and the phosphor element,
   which is penetrated by the pump beam bundle,
   wherein the lens system has a focus and the phosphor element is arranged at the focus,
   wherein a lens of the lens system has a scattering means which scattering means the pump beam bundle penetrates and is widened at the same time, so that the pump beam bundle is incident on the phosphor element in a manner widened around a focus point;
   wherein the lens comprising the scattering means has a spherical light entry surface; and
   wherein the pump beam bundle is incident on a pump radiation incidence surface of the phosphor element and a surface focal point of the pump radiation incidence surface has a distance d taken along a surface normal in relation to the spherical light entry surface and a sphere on which the spherical light entry surface is based has a radius R, wherein $d \geq 0.9 \cdot R$, preferably $d=R$.

* * * * *

UNITED STATES PATENT AND TRADEMARK OFFICE
CERTIFICATE OF CORRECTION

| | | |
|---|---|---|
| PATENT NO. | : 10,197,228 B2 | Page 1 of 1 |
| APPLICATION NO. | : 15/328905 | |
| DATED | : February 5, 2019 | |
| INVENTOR(S) | : Sergey Khrushchev | |

It is certified that error appears in the above-identified patent and that said Letters Patent is hereby corrected as shown below:

In the Claims

Column 10, Line 45, Claim 5: Please delete "alight" and insert --a light-- in place thereof.

Signed and Sealed this
Sixteenth Day of April, 2019

Andrei Iancu
*Director of the United States Patent and Trademark Office*